United States Patent [19]
Imperiali

[11] 3,940,309
[45] Feb. 24, 1976

[54] ELECTROMAGNETIC SAFETY DEVICE FOR THE SUSPENSION OF THE RODS IN A NUCLEAR REACTOR

[75] Inventor: Franco Imperiali, Rome, Italy

[73] Assignee: Comitato Nazionale per l'Energia Nucleare, Rome, Italy

[22] Filed: Apr. 10, 1973

[21] Appl. No.: 349,691

[30] Foreign Application Priority Data
Apr. 14, 1972 Italy .................................. 49626/72

[52] U.S. Cl. .................. 176/22; 176/20 R; 335/219; 335/259
[51] Int. Cl. ........ G21c 7/12; G21c 7/18; G21c 7/36
[58] Field of Search .......... 335/219, 220, 258, 259; 176/19, 20 R, 22

[56] References Cited
UNITED STATES PATENTS

| | | | |
|---|---|---|---|
| 3,091,725 | 5/1963 | Huston | 335/258 |
| 3,465,333 | 9/1969 | Pihl | 335/219 |
| 3,750,151 | 7/1973 | Dill | 335/219 |

*Primary Examiner*—Benjamin A. Borchelt
*Assistant Examiner*—Thomas H. Webb
*Attorney, Agent, or Firm*—Stevens, Davis, Miller & Mosher

[57] ABSTRACT

A coupling is provided for holding and releasing a safety and a safety-and-control rod in a nuclear reactor which coupling comprises three pairs of electromagnets, said electromagnets being arranged in a circular row and act upon a single armature attached to the rod; the electromagnets of each pair being disposed at diametrically opposed position with respect the the rod axis. The signal from each sensor of a set of multiple sensors of each relevant parameter of the reactor operation is supplied to a meter of the parameter. The signals from one of each set of meters are conjointly supplied to a logic circuit which is connected to an amplifier. Finally the power from each amplifier is separately supplied to each pair of electromagnets for controlling the hold and release of the rod. The electromagnets of the coupling are arranged in a circular row and act upon a single armature attached to the rod.

2 Claims, 7 Drawing Figures

ELECTROMAGNETIC SAFETY DEVICE FOR THE SUSPENSION OF THE RODS IN A NUCLEAR REACTOR

The present invention relates to a safety device for the control and safety rods of a nuclear reactor with vertical rods to the control drive mechanism that is to the mechanism for inserting into or withdrawing from the reactor the power control rods.

This type of rods in addition to control functions, perform also a safety function in as much as the release thereof from the drive mechanism can be commanded which, in the case of vertical rods, results in the dropping of the rods into the reactor and as a consequence the shutdown of it.

In fact those rods which are intended for performing the twofold task of control and safety rods are affixed to the drive mechanism through an electromagnetic coupling. This coupling comprises a portion which is attached to the drive mechanism and contains a core with the related energizing winding — that is an electromagnet — and a portion attached to the rod — electromagnetic armature.

While operating normally or even abnormally but within certain safe limits, the magnet is permanently energized and the rod is maintained suspended at a level which is determined by the drive mechanism.

On the other hand, when particular conditions occur of the reactor operation, whereby the reactor must be shutdown, the power supply to the electromagnet is cut off and the rod drops into the reactor and causes that kind of shutdown which is called scram.

Each of the two functions — control and safety — of the rod are dependent on a set of data different and independent from one of the others. In fact the data on which the operation of the drive mechanism is dependent are different by their own nature and by their magnitude from the data on which the release device is operated.

Because this invention is intended for improving the means for achieving a safety control of the reactor with an increased safety factor, the drive mechanism and the related control means will be dealt with briefly. It should be noted that a failed shutdown of a reactor may bring about a disastrous situation, the untimely shutdown may also bring about undesirable consequences. From this the requirement ensues of providing the electromagnet coupling and the related controls with the highest possible reliability.

The means which control the electromagnetic coupling include a number of sensing units or transducers sensitive to changes in various quantities such as the coolant temperature, the ratio of the reactor power and the coolant flow rate, the fuel temperature etc.

The sensed data are fed to a series of combinational circuits which take into account the magnitude of the signals from the sensing units and evaluate all together to find out whether the conditions exist which impose the reactor shutdown.

The input from the combinational circuit or logic lines are supplied to a feeder of the suspension electromagnet of the rod.

In general in the existing plants, in order to improve the reliability of the safety control system, the number of sensing units of the logic lines of the feeders have been multiplied; however no such system is presently available wherein the magnet for suspending the rods is multiple.

In other words, in the current plants, upstream of the electromagnet a high safety level is attained which is proportional to the number of logic lines connected in parallel. For example, of these logic lines, one can be assumed to be excluded due to a failure or for checking purposes without discontinuing the electromagnet supply. When determining the safety level of the lines by which the coupling is controlled, two aspects are to be considered, that is the requirement of ensuring the coupling effectiveness in the case also of a failure of a portion of said lines whereby it no longer supplies the coupling and the requirement of ensuring the release of the rod in the case of a failure of said portion of lines in a sense opposite to the former one, that is in the case that, although the conditions occur for the reactor shutdown, the safety rods still remain suspended because a portion of the coupling remains energized sufficiently to support the rod. In general the current safety systems are provided with three safety lines of which two at least must operate for obtaining the desired action. With this criterion, which hereinafter will be referred to as "two out of three logics" one of the three lines can suffer a failure or can be excluded for overhaul purposes without impairing the system effectiveness. However, with such systems, the servicing of a whole protective line to begin from the sensor of the reactor condition up to the electromagnet inclusive can be effected. This is a major limitation of the reliability level of the system.

The main object of this invention is therefore to provide a suspension coupling for a control and safety rod which coupling comprises a plurality of electromagnets that have a plurality of electromagnet cores and related windings which are independent from one of the others. The magnetic fluxes of said plurality of electromagnets sum on a single armature which is attached to the rod. The total attractive force of the electromagnets is redundant with respect to the force required for ensuring a safe connection between the rod and the drive mechanism.

Concurrently the redundant fraction of electromagnets should not be greater than that strictly required in as much as a failed de-energization of the redundant fraction when a release of the rod is required must not prevent such release. A coupling according to this invention permits the redundant fraction of electromagnets to be cut off for check and overhaul purposes without impairing the safety of the reactor.

The coupling structure and operation will be better understood from the following description and annexed drawings which illustrate, as a non limitative example, a preferred embodiment thereof.

Figure 1:
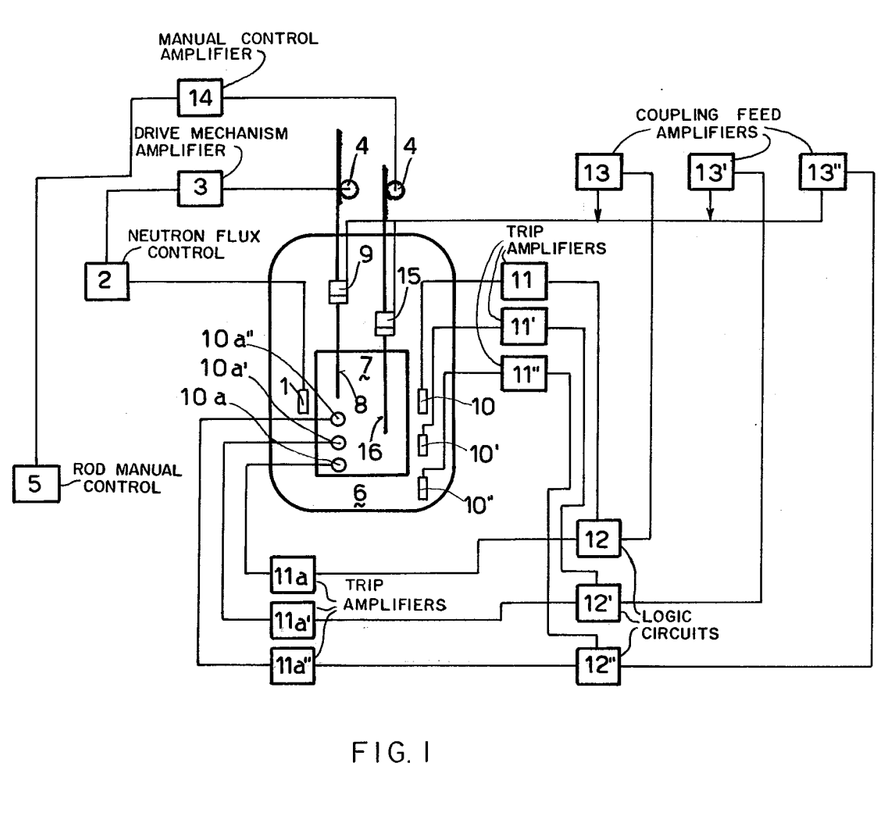
FIG. 1 is a diagram of a nuclear reactor provided with control means of the control and safety rods according to the prior art.
Figure 2:
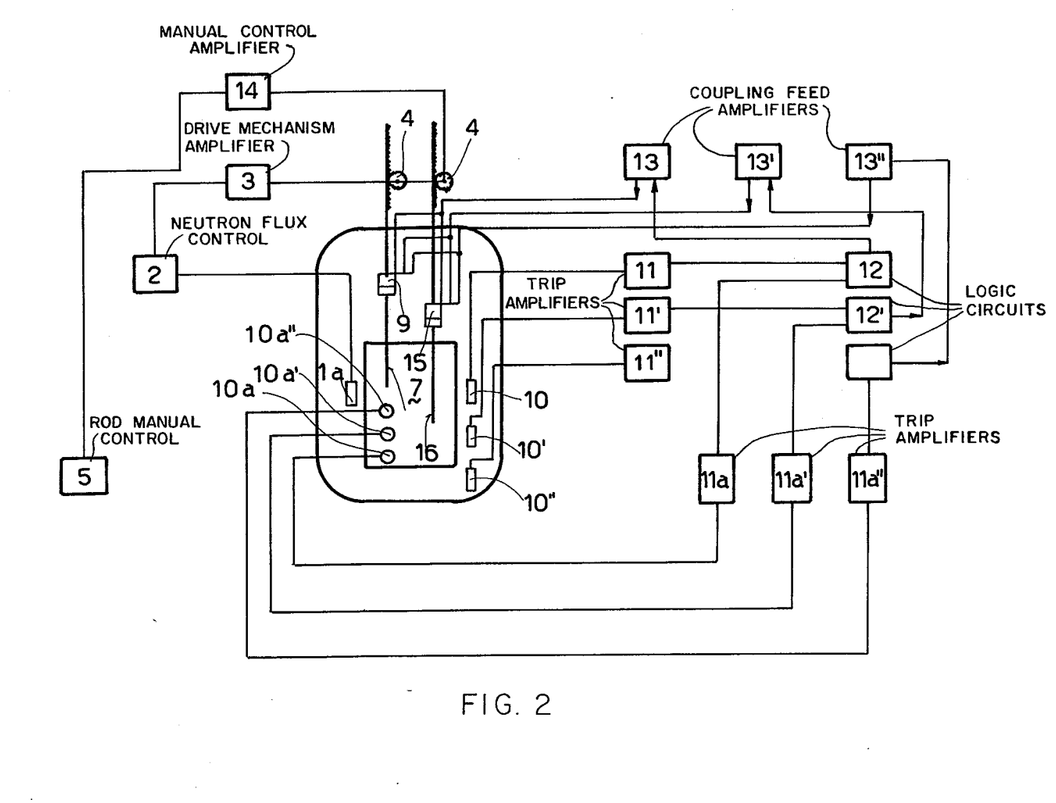
FIG. 2 is a diagram of a nuclear reactor provided with control means of the control and safety rods according to the invention.

With reference first to FIGS. 1 and 2, a reactor is schematically illustrated in each of them but, while the reactor of FIG. 1 is provided with control means of the control and safety rods according to the prior art, the control means of the control and safety rods of the reactor in FIG. 2 are based on the present invention.

Reference number 6 indicates the reactor vessel, 7 indicates the reactor core and 10, 10', 10'' indicate the tripled sensor of one of the reactor operating parameters of interest which are continuously monitored for conditions requiring a safety action; 10a, 10a', 10a'' being the tripled sensor of another parameter. For clarity the sensor of two only of said parameters are indicated which may be, for instance, the coolant temperature and the neutron flux.

In order to attain an higher reliability of the safety system, each parameter or quantity is measured by three sensors which may as well be of different make. The signals from the three sensors are supplied respectively to three trip amplifiers (11, 11', 11'') and (11a, 11a', 11a'') of the variable quantities being monitored. The function of trip amplifiers 11, 11', 11'' and 11a, 11a', 11a'' is that of producing an alarm output signal when the input signal exceeds the predetermined threshold of the trip amplifiers. The output signals from said trip amplifiers are supplied to a triad of logic circuits 12, 12', 12'' by which the data of the alarm signals are processed. The function of logic circuits 12, 12', 12'' is to determine the electromagnets cut off in couplings 9 and 15 of the rods — of which two only are shown for better clarity — by supplying the amplifiers 13, 13', 13'' of the couplings with appropriate signals. In case of abnormal operation of the reactor, amplifiers 12, 12' and 12'' are cut off by these signals and as a consequence couplings 9 and 15 of rods 8 and 16 are de-energized and the rods are dropped into the reactor core, whereby the reactor is scrammed.

In FIGS. 1 and 2 the elements are shown which take part in the drive system of the rods for controlling the reactor operation, which elements are shown for illustrative purposes only in as much as they are not included in the objects of this invention.

Such elements include: a sensor 1, 1a representative of the various sensors of the significant parameters — such as the neutron flux — of the reactor conditions; an automatic control 2 of the neutron flux level, an amplifier 3 of the drive mechanism 4 of rods 8 and 16. In addition, a drive manual control 5 of the rods is provided which acts on mechanism 4 through an amplifier 14. By comparing the diagrams of FIGS. 1 and 2 the novel features and advantages become apparent of the safety system of this invention as illustrated by FIG. 2. In fact, while in the systems of the prior art a coupling such as couplings 9 and 15 is fed by all three amplifiers 13, 13', 13'' mounted in parallel, three separate supplies for feeding three separate fractions of the coupling are provided in the system according to this invention. In the particular embodiment to be discussed hereinafter, each amplifier supplies one of the three pairs of electromagnets which make up the electromagnetic assembly of each coupling.

The advantage readily appears of maintaining the control lines — three lines in the present case — of the coupling separate from one another as far as the inside of the coupling. In fact in the plants of the prior art, the reliability of the safety system is maintained at a high level as far as the coupling treshold while it dangerously drops to a low level within the coupling; on the other hand, with the system of this invention, the reliability level of the system upstream of the coupling is maintained unchanged within the coupling also.

According to a non limitative embodiment of the invention, the coupling for suspending the control and safety rods — see FIGS. 4 to 7 and FIG. 3 which illustrates the electric diagram thereof — comprises six cores 51 to 56 of which each is provided with an energizing winding 51' to 56'. The sectioned portion 69 of FIG. 6 indicates the outer core of an electromagnet assembly.

Figure 5:
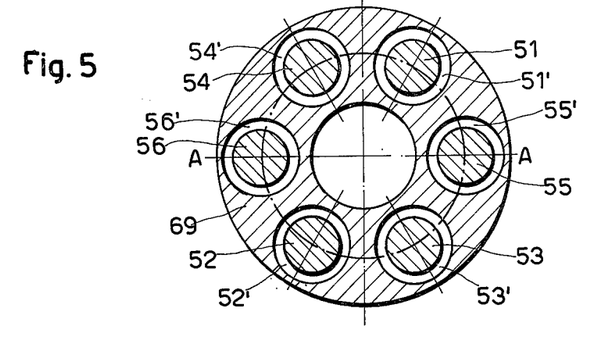
FIG. 5 is a plan view from below of the eletromagnet assembly of FIG. 6 seen from plane PP of said Fig.
Figure 6:
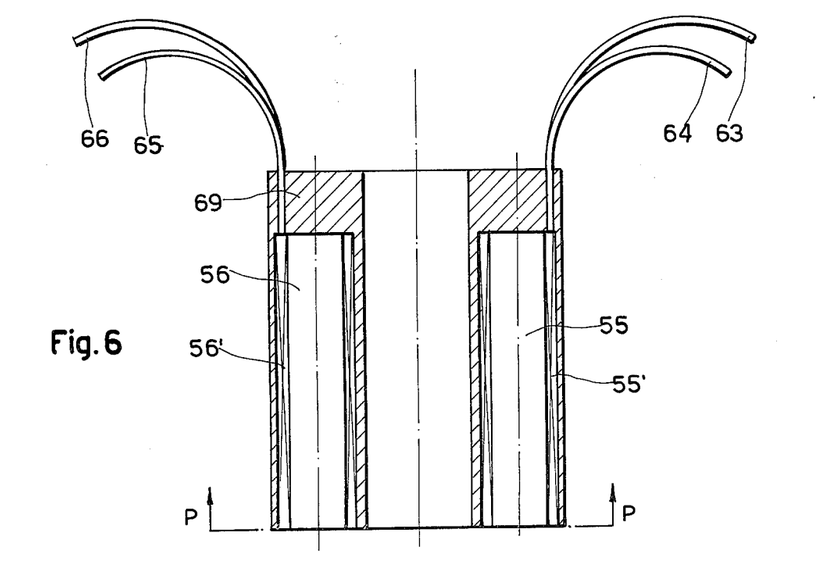
FIG. 6 is a longitudinal cross-sectional view of the electromagnets included in the coupling of FIG. 4.
Figure 7:
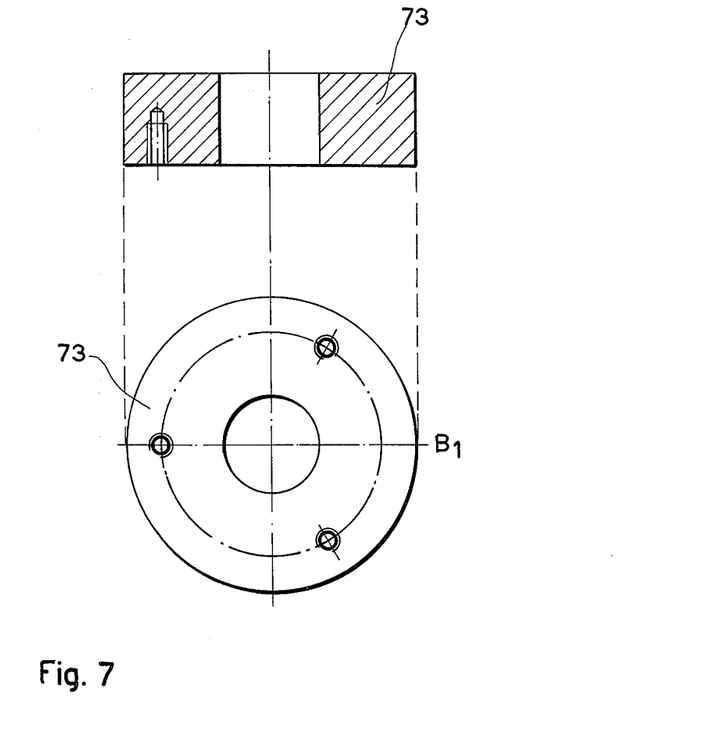
FIG. 7 illustrates a longitudinal cross-sectional view and a plan view from below of the armature of the electromagnet assembly of FIGS. 5 and 6.

In FIG. 6, which is a longitudinal cross-sectional view of the electromagnet assembly along plane AA of FIG. 5, two cores 56 and 55 are schematically shown not sectioned along with the related windings 56' and 55'. In the same figure, the cables 63–66 are shown for connecting the energizing windings of the related amplifiers.

By reference number 73 the armature is indicated of the whole electromagnet assembly. To armature 73 rod 74 is attached by means of a bell-and-spigot joint.

Figure 3:
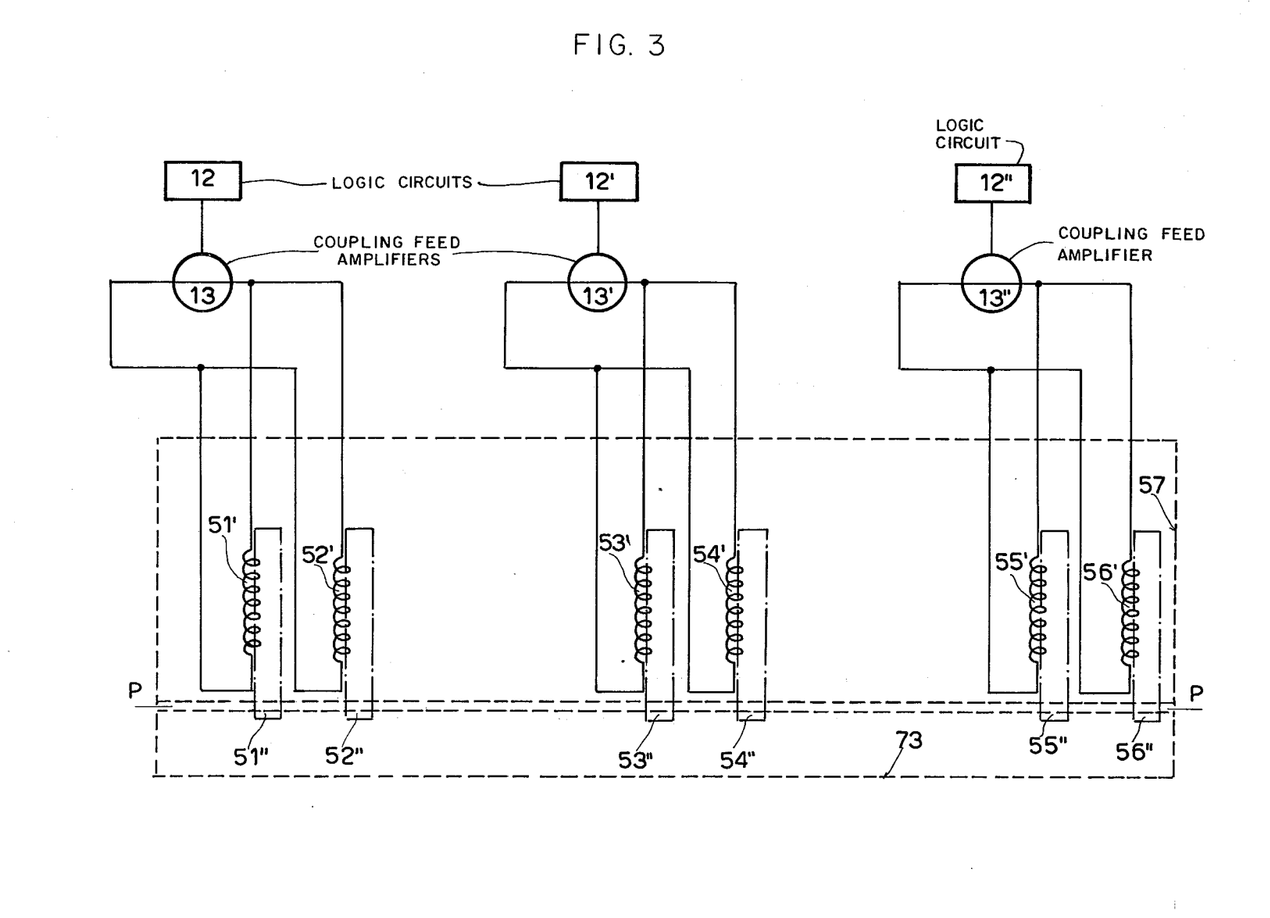
FIG. 3 is a diagram of the electrical connections of the electromagnets in a coupling for control and safety rods according to this invention.
Figure 4:
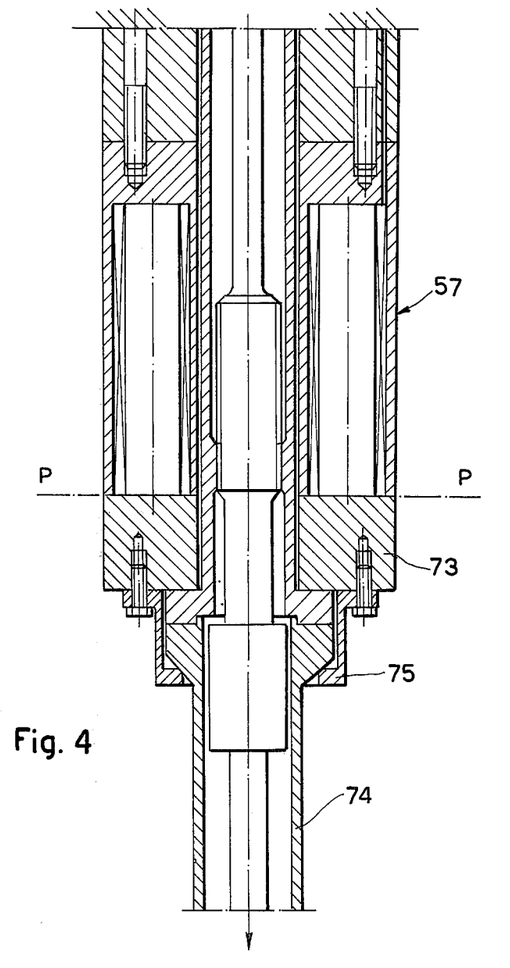
FIG. 4 is a longitudinal cross-sectional view of a coupling for control and safety rods according to this invention.

The electric diagram of electric connections of the coupling electromagnet assembly according to the invention is shown by FIG. 3. Three logic circuuits 12, 12', 12'' are shown therein for processing the data in the alarm signals from the meters of the parameters to be monitored. Obviously the data related to all the monitored parameters are supplied to each of the three logic circuits. In other words, if three parameters are sensed with tripled sensing units, three signals are fed to each of the logic circuits, each signal originating from one of the three sensors of the monitored parameters.

The logic circuits 12, 12', 12'' are connected to amplifiers 13, 13', 13'' of which each feeds a pair of electromagnets connected in parallel: for instance amplifier 13 feeds electromagnets 51 and 52. The magnetic flux of the latter is indicated with 51'' and 52'' respectively which loops into the armature 73 which is shown in cross-sectional and plan view in FIG. 7 and in schematically developed form by the dashed line 73 of FIG. 3.

Because electromagnets 51 and 52 are located at diametrically opposed positions with respect to the longitudinal axis of rod 74 their holding forces will give a resultant coinciding with said axis.

The coupling electromagnets according to the embodiment herein described are dimensiones to satisfy the following equation:

$$(F_{51} + F_{52}) + (F_{53} + F_{54}) + (F_{55} + F_{56}) = \frac{3}{2} F_B$$

where the symbols from $F_{51}$ to $F_{56}$ indicate the forces exerted by the electromagnets from 51 to 56 and $F_B$ indicates the forces required for the coupling to hold the rod.

The holding force exerted by each pair of electromagnets is equal to one half the force $F_B$ and therefore is not sufficient by itself for holding the rod, while the force exerted to the total of the electromagnets is redundant, the redundancy margin being $\frac{1}{2}F_B$. In this way two pairs of electromagnets only are to be energized in order to achieve a safe connection at the coupling, while a single pair cannot succeed in keeping the connection. Concurrently when the reactor condition requires the shutdown thereof, this will be obtained even if, due to failure, one of the logic lines including the pair of magnets depending thereon remains alive. The "two out of three" logic system provides therefore the safe safety level both with regards to the coupling hold and to the release.

The energizing windings of the electromagnets are so designed that the related cores are brought to saturation by them whereby any change of the feeding current in excess of the operating current does not produce any significant increase of the flux. By this artifice any failure of the amplifiers liable to produce a current in excess of the operating current will not put a single pair of electromagnets in a condition for supporting the total rod load.

Obviously, a shim, e.g. of copper or chromium, is inserted between the electromagnets and the armature which shim is obtained by electrically plating the reciprocally facing surfaces of the core and armature so that the residual magnetism effects are eliminated which effects would add to the holding flux and would impair the proper operation of the electromagnet.

The coupling according to this invention will offer the following advantages:

1. The total of a line by which a pair of electromagnets is controlled starting from the sensor down to the electromagnet inclusive can be shut off without causing the rod release. This check can therefore be effected periodically during the reactor operation.
2. In case a reactor shutdown is required, a failure of one of the amplifiers — which therefore will not shut off the supply to the electromagnets associated thereto — does not result in a disastrous condition in as much as a pair of electromagnets is not adequate by itself to hold the rod not even if an internal failure of the amplifier puts it in a condition for overfeeding the electromagnets associated thereto. The reason has been already explained and consists in the fact that the electromagnets are working in a saturated state. The increase of the reliability level consequent to this feature of the invention is remarkable.
3. The amplifiers can be subjected to maintenance and overhaul or replacement one at a time without impairing the steady operation of the reactor.
4. In conventional plants each of the parallel connected amplifiers 13, 13', 13'' by which the electromagnets are fed is effective for holding the related coupling. Thus in the conventional plants, when a shut down of the reactor is requested by the safety system and one only of said amplifiers fails to respond to the safety system instructions, that is it fails to stop operating, then a missed shut down of the reactor occurs.

On the other hand in the plants according to this invention at least two operating amplifers are required for holding the associated coupling. Thus in this case, when an amplifier fails to respond to the safety system instructions, that is it fails to stop operating while the other two respond to it, the rod drops and shuts down the reactor even if one of the three amplifiers is still operating. Two amplifiers should fail to stop operating for causing a missed shut down of the reactor, which is obvious a less probable event than a single amplifier failure.

5. In addition to the logic system of the the type "two out of three", other types of logic systems can be employed in the device of this invention. By the above discussed "two out of three" logic system, that is, by a system wherein two out of three pairs of electromagnets are effective for ensuring the coupling hold, the same safety level is attained with respect to both the hold and the release of the coupling. The two functions of the coupling will be ensured at safety levels which are different from one another when other logic systems are adopted. For instance safety levels will be attained by the logic systems "two out of four", "two out of five", "two out of six" etc. which are higher than the safety level attained by the "two out of three" logic system with respect to the hold but which are lower with respect to the release. Thus lower safety levels will be provided by the logic systems "four out of five", "five out of six" etc. with respect to the hold and higher levels with respect to the release.

If for instance a logic system of the type "four out of five" is to be employed, the following equation should be satisfied:

$$F_1 + F_2 + F_3 + F_4 + F_5 = \frac{5}{4} F_B$$

where the symbols from $F_1$ to $F_5$ indicate the forces of five hypothetical electromagnets and $F_B$ indicates the force required for the coupling to hold the rod.

Based on the latter equation, the attractive forces of four electromagnets provide a sufficient force for holding the rod while three electromagnets are not strong enough for holding it. Thus from the point of view of the holding action, one electromagnet or a pair only can fail without impairing the holding function, while from the point of view of the releasing action, up to three electromagnets can remain energized without impairing the release function.

6. Because the maintenance operations can be effected on a whole safety line from the sensor up to the electromagnet or pair of electromagnets without reducing the safety level of the plant, the probabilities of spurious operations by the safety lines are remarkably reduced such as those caused by failures of the amplifiers or of the logic circuits. This is an important feature in as much as, due to the complications of the logic circuits as required for operating the coupling electromagnets, the probability of failures can have a considerable incidence on the device reliability.
7. The hold and release logic circuit directly extends into the very electromagnet assembly of the coupling; the fluxes of the various electromagnets separately concur — the same as the logic circuits — in forming the collective holding force of the coupling. In other words, the holding action is given by a number of fluxes separately responsive to the related logic circuit, which fluxes add together at the armature. The safety lines remain therefore separated from the beginning to the end thereof.

Such independent condition would not be attained for instance in a coupling wherein as many windings as the amplifiers were wound on a single core. In fact in such a coupling, a failed cut off of an amplifier combined for instance with an excess voltage of the same could allow the winding connected to said feeder to exert a strong enough holding force. In fact, in such a case, the core of each electromagnet cannot be made to work at saturation when one only of the windings is energized as is the case with the device of this invention wherein each core has a single winding only.

What is claimed is:

1. An electromagnet coupling for supporting a safety rod and a control-and-safety rod in a nuclear reactor which coupling comprises a plurality of electromagnet means acting in parallel on a single armature common to all of them each of said electromagnet means being provided with an energizing winding adapted for being fed separately from the other; in which coupling a fraction only of the total number of electromagnet means is necessary for holding the suspended rod.

2. In a safety system for a nuclear reactor with vertical safety rods said system comprising three $n$ sensing means of $n$ variable quantities such as for example coolant temperature, fuel temperature and ratio of reactor power to coolant flow rate of the reactor operation, three $n$ measuring means of said variable quantities each provided with limiting threshold 3, logic circuits to each of which one of the output signals from said three $n$ measuring means is supplied, three amplifying means which are separately supplied with the three output signals from said logic circuits, a coupling means for releasably supporting each safety rod in the reactor which coupling means comprises six identical electromagnets with vertical axes arranged in pairs in a circular row at regular distances from one another around the rod axis, the electromagnets of each pair being disposed at diametrically opposed positions with respect to said axis and a single annular armature attached to said rod and located beneath said six electromagnets to contact the lower ends thereof; the windings of each pair of electromagnets being supplied in parallel by one of said amplifying means; said electromagnets being so dimensioned that two pairs of them are capable of holding the supported load comprising the rod while a single pair of electromagnets is not capable of holding the rod.

* * * * *